United States Patent [19]

Cracco et al.

[11] 3,877,575
[45] Apr. 15, 1975

[54] FILM TRAY HOLDER

[76] Inventors: Victor J. Cracco; Ruth A. Cracco, both of 15449 Woodlawn East, South Holland, Ill. 60473

[22] Filed: July 9, 1973

[21] Appl. No.: 377,808

[52] U.S. Cl. .................. 206/391; 206/72; 206/387; 206/459; 220/21; 220/260; 220/352
[51] Int. Cl..... B65d 85/67; B65d 1/36; B65d 43/08
[58] Field of Search ............... 206/387, 391, 72, 73; 220/21, 42 A

[56] References Cited
UNITED STATES PATENTS

| | | | |
|---|---|---|---|
| 1,733,565 | 10/1929 | Tabita | 206/72 |
| 2,465,644 | 3/1949 | Graves | 220/21 |
| 2,884,977 | 5/1959 | Berman | 220/21 UX |
| 2,944,663 | 7/1960 | Kaspari | 206/45.34 X |
| 3,674,132 | 7/1972 | Loss | 206/387 |
| 3,710,900 | 1/1973 | Fink | 206/DIG. 36 |

*Primary Examiner*—Leonard Summer
*Attorney, Agent, or Firm*—Marden S. Gordon

[57] ABSTRACT

The embodiment of the invention disclosed herein is directed primarily to structural improvements in storage containers which are used in the field of photography, such as film tray holders, and the like. The film tray holder provides an orderly manner for storing and transporting a plurality of individual films, and is fashioned to allow a plurality of such film tray holders to be stacked one on top of another in storage areas. The film tray holder includes a base member of a predetermined size, and each film to be stored therein is inserted into an elongated slot formed in the base. The slots formed in the base are oriented in rows and columns to provide an orderly manner for visually scanning the films and determining the contents of the film in the film tray holder. Also, a web portion is formed between each of the slots and provides means for receiving information as to the contents of the particular film located in that slot. A cover unit is provided to fit over the base and prevent dust and other foreign material from substantially deteriorating the film quality of the film stored therein. Hand gripping removal means are fashioned on opposite sides of the cover unit thereby providing a smooth top surface of the cover so that other additional film tray holders can be stacked on top.

2 Claims, 4 Drawing Figures

PATENTED APR 15 1975 3,877,575
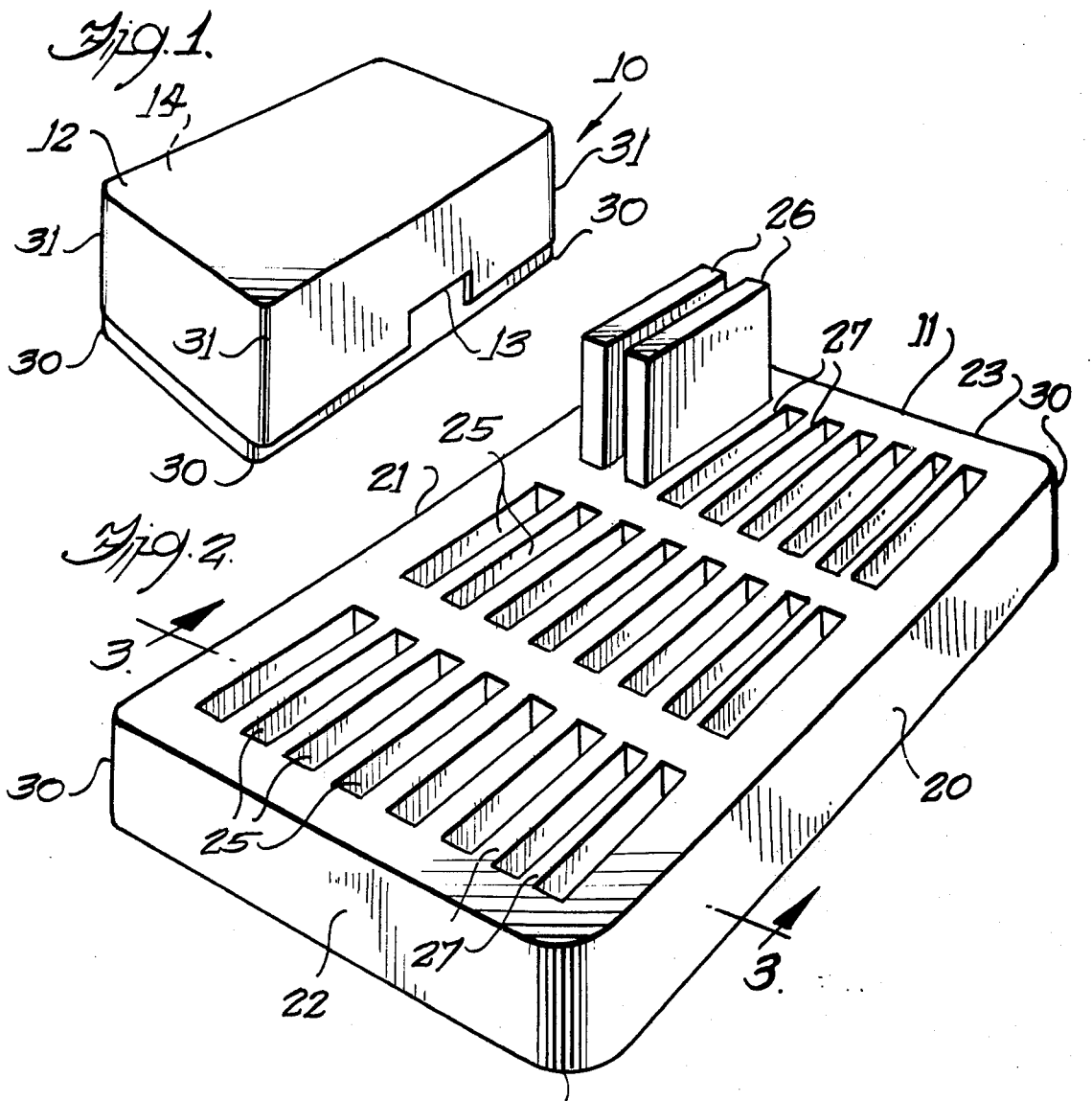
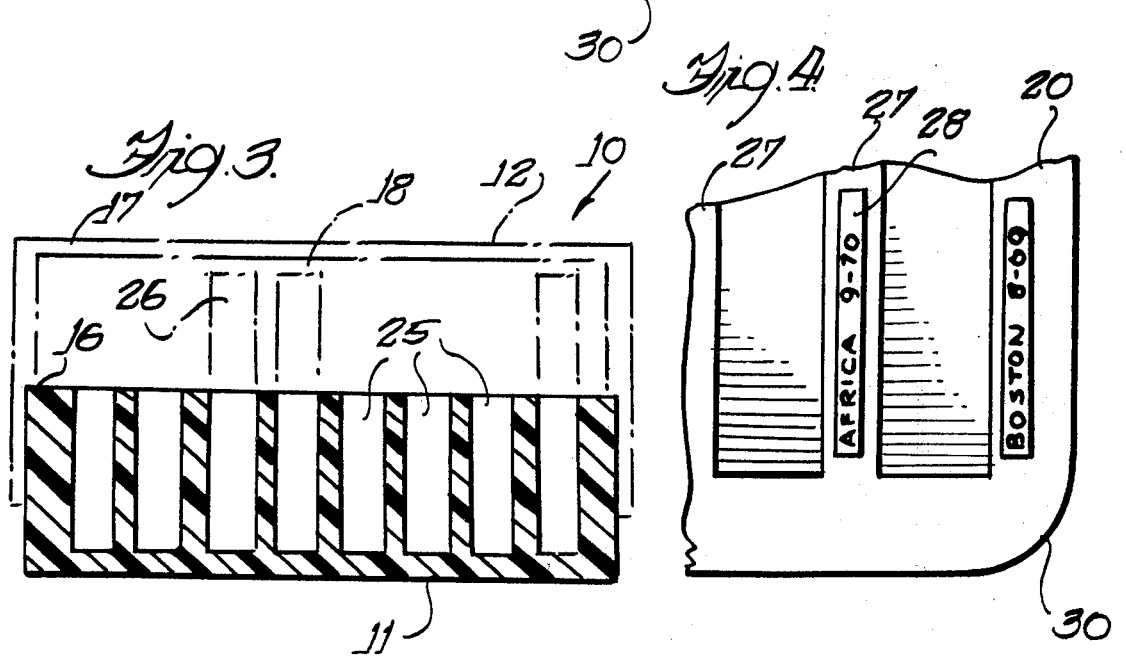

FILM TRAY HOLDER

BACKGROUND OF THE INVENTION

1. Field of the Invention

This invention relates generally to improvements in structures and apparatus used for storing small articles such as containers of film, and more particularly to a film tray holder and its combination with a plurality of slots and a cover structure which allow the particular film tray holder of this invention to be easily stored when not in use. However, it will be understood that while this invention is directed particularly to film tray holders, the specific device disclosed herein can be used in other fields such as may be required to store a plurality of packages or the like.

2 Description of the Prior Art

With the increased sales of modern photographic equipment such as motion picture cameras and the like, and sound projectors, a need arises for equipment for conveniently storing and transporting small containers of photographic film on spools or reels. These spools or reels are characteristically small circular devices often stored in a single rectangular cardboard container or a relatively thin plastic receptacle having automatic thread means for placing the film on a camera and projecting the film without removing it from its container. When a film is so utilized the entire container is inserted into the camera equipment and any defects to the film such as dust or foreign material will be a detractive characteristic of viewing the film.

It will be apparent that the characteristic size and shape of a film reel and its associated square container will require equipment for storage and transport thereof which is of sufficient sizes and shapes, depending on the most common sizes and shapes being utilized by a particular user to receive the film containers. Additionally, the characteristic size and shape of the film container may correspond substantially to an average 200 foot reel, or other similar common size, because these common sizes lend themselves to easy manipulation and threading into the camera equipment to which they are to be used.

However, prior art type storage devices are generally designed for storing cartridges, or the like, and do not include indicia bearing web portions between slots os that information as to the contents of the film can be applied thereto and viewed at a later date for selecting of the film. Furthermore, prior art tray devices do not incorporate cover means which substantially completely seal the tray from outside dust and foreign material and which cover provides a smooth top surface upon which other film trays can be stored.

SUMMARY OF THE INVENTION

Accordingly, the present invention is designed to overcome the limitations that are attainable with respect to prior art storage trays for either magnetic tapes or photographic film. It is a feature of the present invention to provide a film tray holder for providing an orderly manner for storing and transporting a plurality of individual films without necessitating the need of removing each film from the tray to read the label on the film container located within the film tray.

Another feature of the present invention is the provision of a film tray holder which has a base member which includes indicia bearing information adjacent each of the slots formed in the base so that identification of the particular film contents can be readily made.

Another feature of this invention is the provision of a film tray holder which is constructed in such a manner as to have the base member thereof formed of diametrically opposed front and rear margins and side margins of a predetermined size. The front and rear and side margins of the base have a dimension greater than the sum of a plurality of individual films to be stored in the tray holder. A plurality of elongated slots formed in the base of the tray holder are dimensioned to have a length substantially equalled to the length of a film container to be stored, and a width substantially equal to the width of a film container, thereby readily to accept insertion of a film container into the slot.

Another feature of this invention is the provision of a film tray holder which is constructed in such a manner as to have the slots formed therein oriented to provide rows and columns, and wherein the individual slots of the rows and columns each being of substantially the same size and configuration.

Another feature of this invention is the provision of a film tray holder which is constructed in such a manner as to have the rows and columns arranged to have three rows and eight slots in each column thereby providing a total capacity for 24 rolls of film.

Another feature of this invention is the provision of a film tray holder which is constructed in such a manner as to have the web portion between slots formed of a sufficient thickness to allow providing indicia therebetween and along the margin of the film tray holder to allow identification of the contents of the film positioned within the particular slot.

Another feature of this invention is the provision of a film tray holder which is constructed in such a manner as to have each of the slots, in a cross-section, in a rectangular configuration to receive a square cornered box containing film therein.

Another feature of this invention is the provision of a film tray holder which is constructed in such a manner as to have a cover forming a lid for the tray, and wherein the cover is arranged to fit below the top margin of the base of the tray and provides a dust tight seal about the base to protect the film contained therein against debris and other impurities.

Another feature of this invention is the provision of a film tray holder which is constructed in such a manner as to have the lid portion fashioned to be positioned about the outer peripheral margin of the base and depending downwardly from the top surface of the base, and wherein the outer margin portion of the cover includes a ridge or recess to set upon the top portion of the base of the tray so that the cover does not exert force on the film containers housed therein.

Another feature of this invention is a provision of a film tray holder which is constructed in such a manner as to have the cover member thereof provided with hand gripping means about the lower peripheral edge of thereof to facilitate the removing of the cover without necessitating providing an upstanding handle upon the cover, thereby allowing the film tray holders to be stacked one upon the other.

Another feature of this invention is the provision of a film tray holder which is constructed in such a manner as to have hand gripping recesses formed about the lower peripheral edge of the cover, substantially centrally thereof to facilitate balancing of the cover as it is raised upwardly from its position in rest on the tray base.

The present invention has a further feature of providing a combination film tray holder and cover wherein the cover is free of all upstanding obstacles such as handles and the like to enable the film tray holders to be stacked one on top of another.

Briefly, the film tray holder of this invention is formed of a base member having a peripheral margin of a predetermined size so as to allow rows and columns of slots to formed therein. A plurality of elongated slots are then formed in regimented rows and columns for maximum efficiency of spaced within the base. The preferred embodiment disclosed herein shows rectangular configurated slots to receive rectangular or square cornered boxes in which rolls of film are stored. However round bottom slots may be used if desired. A cover is fitted over the base and is provided with a ridge at the inner peripheral wall of the cover to rest on the top peripheral margin of the base and support the cover above the height of the boxes of film carried by the base. This then prevents smashing of the boxes of film as the cover does not completely telescope over the base so that the inner wall surface of the cover engages the film, but rather is supported to prevent this very condition. This then enables other film tray holders to be stacked one on top of the other.

Many other features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of a film tray holder and its associated covering, which film tray holder and cover are constructed in accordance with the principles of this invention;

FIG. 2 is a perspective view of a base member associated with the film tray holder of this invention and which illustrates two film boxes inserted into elongated slots fashioned to receive such boxes;

FIG. 3 is an elevational sectional view taken through the end portion along Line 3—3 of FIG. 2 to illustrate the general rectangular configuration of the lower portion of the slots; and FIG. 4 is an enlarged fragmentary view of a corner portion of the base member of FIG. 2 here illustrating information as to the contents of film inserted into slots adjacent the web associated with the slot.

DETAILED DESCRIPTION OF THE ILLUSTRATED EMBODIMENT

Referring now to FIGS. 1, 2, 3 and 4 there is seen the details of construction of a film tray holder fashioned in accordance with the principles of this invention and designated generally by reference numeral 10. The film tray holder 10 includes a base member 11 which is of a predetermined size, so as to be substantially greater than a given multiple of widths and thicknesses of a plurality of film boxes or reels to be stored therein. The cover 12 is fashioned to fit about the peripheral margin of the base and is designed to have no handles or other obstructions formed at the top of the cover. To facilitate removal of the cover from the base member a pair of diametrically opposed hand gripping portions 13 and 14 are provided. These hand gripping portions may take any desired configuration. To ensure that the cover 12 does not fully lower or telescope over the base member 11 an inner peripheral ridge portion 16 is formed a predetermined distance from the top surface 17 of the cover 12 and thereby provides a continuous gap 18 above the topmost edge of a plurality of film boxes to be inserted into the film tray holder.

The base member 11 and cover 12 can be formed of any suitable material such as molded plastic, styrofoam, or fashioned of machined parts such as aluminum and steel or cast parts such as aluminum, metal or the like. The particular material from which the cover 12 is constructed depends on the general overall strength required of the film tray holder. Also, the film tray holder and its associated cover and base may be of any suitable color as desired, and these colors may be associated with the particular storage conditions to be observed as to temperature and the like.

The base member 11 may be formed of front and rear marginal portions 20 and 21, respectively and side marginal portions 22 and 23 to define an area in which a plurality of elongated slots 25 are formed. The slots 25, as best seen in FIG. 3, and square cornered and rectangular in configuration to receive a plurality of square film container boxes 26 as shown in FIG. 2.

In the preferred embodiment, each of the slots 25 is spaced by a web portion 27 so that identification information as indicated by reference numeral 28 can be located adjacent the slot containing the film thus being identified. Also it will be understood that the forward margin 20 may include indicia bearing information so as to identify the first of the films within the column of slots. However, it will be understood that the rear margin portion 21 may be the margin having the identification information.

The base member 11 may be constructed of substantially the same material as is of the cover 12, that is, it may be constructed of molded plastic, wood fabrication or metal to correspond to the particular strength requirement needed, or it may be made of a different kind of material.

The base member 11 is here illustrated as having somewhat rounded corners 30 with correspondingly shaped rounded corners 31 formed on the cover unit 12. However it will be understood that this particular configuration may be changed to provide substantially square corners for both the base member 11 and cover unit 12.

While a single specific embodiment of the present invention has been illustrated herein it will be understood that variations and modifications may be effected without departing from the novel concepts of the invention as claimed hereinbelow. For example, variations as to size, shape and configuration can be effected without altering the inventor's concepts.

We claim:

1. A film tray holder for providing an orderly manner for storing and transporting a multiplicity of individual film containers, the holder comprising, in combination:
  a solid rectangularly elongated box shaped base member consisting of a flat horizontal bottom surface, a flat horizontal top surface spaced vertically from said bottom surface, opposed parallel front and back wall surfaces, and opposed parallel side wall surfaces;

said front, back and side wall surfaces of said base member being spaced apart a dimension greater than the sum of a plurality of individual film containers to be stored therein;

a plurality of identically shaped and configured vertically extending slots disposed in said base member in the form of rows extending parallel to said front and back walls and columns extending parallel to said side walls, each of said slots being dimensioned to have a length and width slightly greater than the length and width of the film container to be inserted therein so as to readily accept the insertion of the film container into the slot, the depth of each slot in the base member being less than the height of the film container to be inserted therein such that the film container projects vertically outwardly of the slot above said base member horizontal top surface when the container is inserted into the slot, each of said slots being, in cross-section, rectangular having square corners to receive a square cornered film containter therein;

a web portion formed between each of the adjacentmost slots extending parallel to said base member front and back walls and within the opposite ends of the slots, said web portion fashioned to receive indicia bearing information thereon to identify the contents of the film container inserted into the adjacentmost slot;

the width of each slot together with the web portion associated therebetween, in addition to the peripheral marginal portion of said base top surface extending along said front and back walls thereof defining the overall maximum width dimension of said base member;

a rectangularly shaped box-like cover member having a flat horizontal top surface, vertically depending opposed front and back wall surfaces extending downwardly from front and back peripheral edges respectively of said top surface, and vertically depending downwarldy opposed parallel side walls extending downwardly from associated side edges of said top surface, said cover side walls and said cover front and back walls each extending an equal vertical distance and terminating in a bottom edge with the bottom edges thereof defining a horizontal plane parallel to said cover top surface and spaced vertically therebeneath;

a compartment defined interiorly of said cover opening out of said bottom end thereof between said bottom edges, the compartment being of a width and length slightly greater than the width and length of said base member to receive said base member telescopically therein;

a horizontally extending ridge formed integrally with the interior surfaces of said cover side walls, front wall and back wall and extending completely therearound to define an annular shoulder spaced inwardly of said cover bottom edges and extending horizontally thereabout parallel to said cover top surface, the spacing between said annular shoulder and the interior of said cover top surface being greater than the projection of said film containers above said base member horizontal top surface;

said cover when telescopically placed on said base member engaging the peripheral edges of said base member top surface on said annular shoulder to support said cover thereon with an air gap existing between the top of the film containers and the interior surface of the cover top surface to prevent any squashing or pressure of the film containers by the cover;

said annular shoulder forming with said cover side wall, back wall and front wall a dust tight seal extending continuously completely about the top surface of the base member to protect the film containers positioned therein to prevent dust, contaminants and other foreign matter from deteriorating the film stored in the film containers positioned in said base member; and a pair of rectangularly shaped recesses formed integrally in said cover front wall and said cover back wall and disposed in diametric alignment with each other centrally of said wall surfaces and formed contiguous with said bottom edge thereof, said recesses defining hand engaging recesses to facilitate ease of removal of said cover from said base member to gain access to the film containers stored therein.

2. A film tray holder as set forth in claim 1 wherein said base member and said cover member are manufactured of a plastic material.

* * * * *